June 24, 1969          H. V. MAIN          3,451,223

ROCKET ENGINE CHAMBER COOLING AND INJECTION SYSTEM

Filed Dec. 6, 1966          Sheet 1 of 2

INVENTOR.
HOWARD V. MAIN
BY
Richard J. Killoren
ATTORNEY
AGENT

INVENTOR.
HOWARD V. MAIN

United States Patent Office 3,451,223
Patented June 24, 1969

3,451,223
ROCKET ENGINE CHAMBER COOLING
AND INJECTION SYSTEM
Howard Vern Main, 27190 Jerome St.,
Boron, Calif. 93516
Filed Dec. 6, 1966, Ser. No. 600,004
Int. Cl. F02k 9/02, 11/04
U.S. Cl. 60—258        2 Claims

ABSTRACT OF THE DISCLOSURE

This invention relates to a cooling and injection system for a rocket engine chamber wherein fuel or oxidizer-rich gases discharged from the low pressure ratio gas generator; or liquid or gaseous propellants directly from the run tanks; are ducted into the throat region of the main rocket engine chamber and are injected tangentially to the chamber wall which has a somewhat spherical shape.

---

The invention described herein may be manufactured and used by or for the United States Government for governmental purposes without payment to me of any royalty thereon.

This invention relates to a cooling and injection system for a rocket engine chamber.

One object of the invention is to provide a means for cooling rocket thrust chamber walls over a wide range of operating conditions.

Another object of the invention is to provide a cooling system for liquid rocket thrust chamber walls which eliminates the need for separate cooling for the injector face.

Another object is to provide an injection system which is not affected in terms of performance or durability by changes in operating temperatures or thermal stress.

A further object of the invention is to provide a coolant flow along the wall of the combustion chamber to provide a continuous barrier of coolant between the wall and the hot combustion gases.

It has previously been impossible to achieve successful results with some propellent combinations because of cooling problems. Also elaborate manifolding propellent routing techniques were required for providing cooling for the injector face.

According to this invention fuel or oxidizer-rich gases discharged from this low pressure ratio gas generator, or liquid or gaseous propellants, directly from the run tanks, are ducted to the throat region of the main rocket engine chamber and are injected tangentially to the chamber wall which has a somewhat spherical shape. Centrifugal force then makes the cool gas flow along the wall thus providing a continuous barrier of cool gas between the wall and the hot combustion products.

Free-standing injectors are provided which allow for thermal growth in any direction without destroying the injection symmetry. The injected gases which flow up along the wall are directed to mix with the oxidizer injected from the free-standing injector assembly. Thin wall housings are used for the injection elements so that by directing the flow of gases across the injector face, no injector cooling manifold or other cooling means are required.

Figure 1:
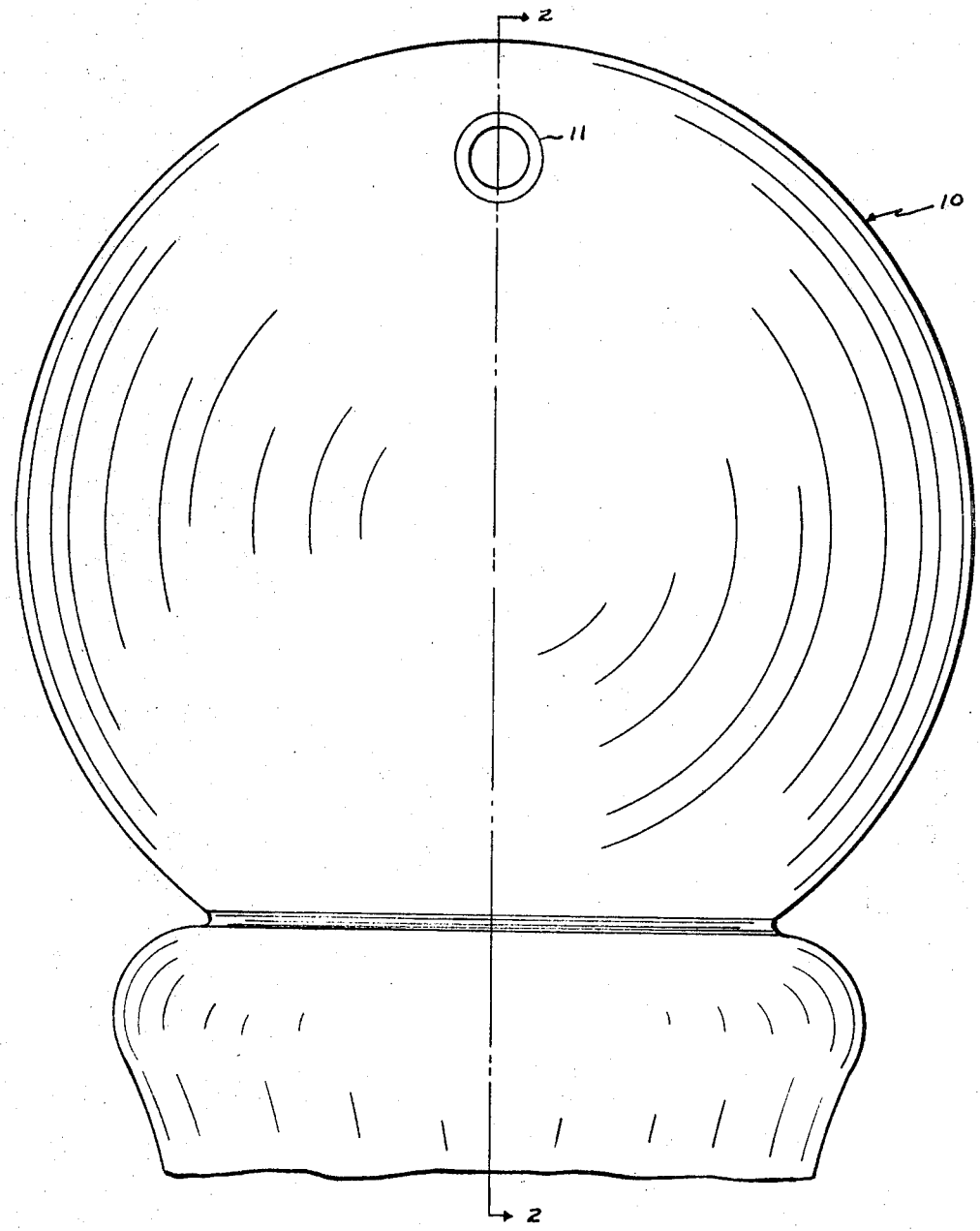
FIG. 1 is a front elevational view of a rocket engine chamber according to the invention.
Figure 2:
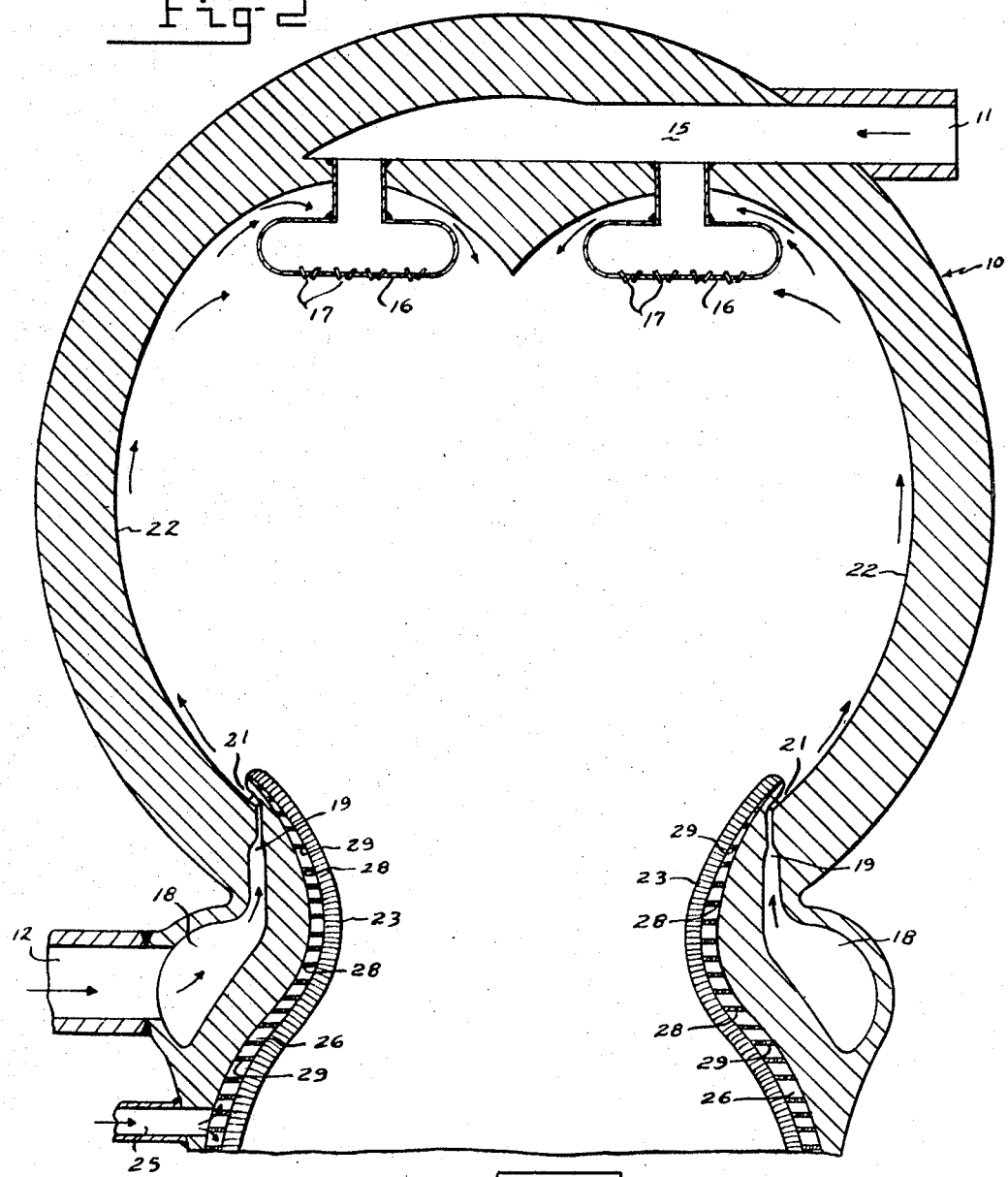
FIG. 2 is a sectional view of the device of FIG. 1 along the line 2—2.

Reference is now made to FIGS. 1 and 2 of the drawing which show a substantially spherical rocket engine chamber 10. An oxidizer inlet is shown at 11 and a fuel inlet is shown at 12. The oxidizer from supply 13, shown in FIG. 3, passes through channel 15 to free-standing injectors 16 and out into the combustion chamber 10 through orifices 17.

Figure 3:
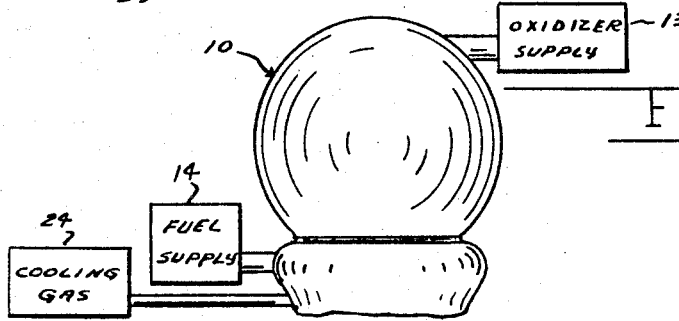
FIG. 3 is a block diagram showing one arrangement for the propellant and cooling system for the device of FIGS. 1 and 2.

The fuel from supply 14, shown in FIG. 3, flows from inlet 12 into an annular injector manifold 18 through passage 19 and out of the injection orifice 21 and along wall 22, to a region adjacent injectors 16 where it mixes with the oxidizer material from the injectors.

The throat section 23 of the combustion chamber is cooled by supplemental cooling fluid, from supply 24 shown in FIG. 3, fed to inlet 25 through annular channel 26. The throat section 23 is made of porous steel or other suitable porous material to provide transpiration cooling for the throat section. The throat section 23 is supported by a plurality of annular support members 28. The annular support members 28 have openings 29 therein to permit the flow of the secondary cooling fluid to the entire chamber 26 to cool the throat section 23.

In the operation of the device, the cool fuel gases from fuel supply 14 enter inlet 12 and pass through annular manifold 18, passage 19 and out through orifice 21 into the combustion chamber 10. The fuel is directed tangentially along wall 22. Centrifugal force causes the gas to flow along the wall to form a cool barrier between the wall and the hot combustion products within chamber 10. The cool gases then flow up around the free-standing injectors 16. The walls of the injectors are made thin so that adequate cooling is provided by the flow of cool gas past them thus making a separate cooling system for the injectors unnecessary.

While the chamber has been described as substantially spherical in shape, it is to be understood that other shapes might be used, for example, the sphere could have an oval shape. Also it is to be understood that for some applications, the fuel could be supplied at 11 and the oxidizer at 12.

There is thus provided a system for cooling rocket engine chambers that permits use of the device over a wide range of operating conditions.

I claim:

1. A rocket thrust device, comprising a thrust chamber having a closed section at one end and a narrow throat section and an open-discharge nozzle at the other end; a curved wall section between said closed end and said throat section; a plurality of thin-walled free-standing injector means at the closed section of said chamber; said injector means having a plurality of injector orifices therein; means for supplying a first propellent material to said injector means; means for directing a flow of a second propellent material tangentially along the inner surface of said wall adjacent said throat section and around said free-standing injector means, to thereby cause said second propellent material to flow along said wall past said free-standing injectors to provide a cooling barrier between said wall and the combustion products within said combustion chamber and to provide cooling for said injectors.

2. The device as recited in claim 1 wherein said combustion chamber has a substantially spherical shape; said means for directing a flow of propellent material along said wall is an annular orifice adjacent the throat section of said combustion chamber; a propellent inlet means including coolant manifold, for supplying said propellent material to said annular orifice, a second inlet means including a second manifold for supplying a coolant to said throat section of said combustion chamber.

References Cited

UNITED STATES PATENTS

| 2,183,313 | 12/1939 | Goddard | 60—39.71 |
| 2,217,649 | 10/1940 | Goddard | 60—258 |
| 2,658,332 | 11/1953 | Nicholson | 60—265 |

FOREIGN PATENTS

| 847,084 | 9/1960 | Great Britain. |

SAMUEL FEINBERG, *Primary Examiner.*